US007017756B2

(12) United States Patent
Reinach et al.

(10) Patent No.: US 7,017,756 B2
(45) Date of Patent: Mar. 28, 2006

(54) MULTI-STAGE PUSHER CENTRIFUGE

(75) Inventors: Harald Reinach, Remetschwiel (DE); Roy Geiger, Schafisheim (CH)

(73) Assignee: Ferrum AG, Rupperswil (CH)

( * ) Notice: Subject to any disclaimer, the term of this patent is extended or adjusted under 35 U.S.C. 154(b) by 0 days.

(21) Appl. No.: 10/820,249

(22) Filed: Apr. 5, 2004

(65) Prior Publication Data

US 2004/0206689 A1 Oct. 21, 2004

(30) Foreign Application Priority Data

Apr. 16, 2003 (EP) ................................. 03405273

(51) Int. Cl.
*B01D 33/46* (2006.01)
*B01D 33/06* (2006.01)
*B04B 3/02* (2006.01)

(52) U.S. Cl. ...................... 210/369; 210/372; 210/376; 210/489; 464/36

(58) Field of Classification Search ................ 210/359, 210/360.2, 369, 372, 373, 376, 488, 489; 494/36

See application file for complete search history.

(56) References Cited

U.S. PATENT DOCUMENTS

| | | | | |
|---|---|---|---|---|
| 2,720,981 | A | 10/1955 | Greenwell | |
| 3,092,580 | A * | 6/1963 | Irving | 210/376 |
| 3,136,721 | A | 6/1964 | Gooch | |
| 3,268,083 | A | 8/1966 | Ruegg | |
| 3,368,684 | A | 2/1968 | Ruegg | |
| 3,395,807 | A * | 8/1968 | Fierstine | 210/376 |
| 3,463,316 | A * | 8/1969 | Fierstine | 210/781 |
| 3,831,764 | A | 8/1974 | Humphrey | |
| 5,356,366 | A * | 10/1994 | Stahl | 494/37 |

FOREIGN PATENT DOCUMENTS

| | | | |
|---|---|---|---|
| DE | 2165719 | A | 7/1973 |
| EP | 0710504 | A1 | 5/1996 |
| GB | 918386 | A | 2/1963 |
| GB | 1518239 | A | 7/1978 |

* cited by examiner

*Primary Examiner*—Fred G. Prince
(74) *Attorney, Agent, or Firm*—Townsend and Townsend and Crew LLP

(57) ABSTRACT

The invention relates to a multi-stage pusher centrifuge (1) for the separation of a mixture (2) into a solid cake (3) and into a liquid phase (4). The multi-stage pusher centrifuge (1) includes an outer screen drum (6) rotatable about an axis of rotation (5) and at least one screen stage (7) arranged in the outer screen drum (6), and a mixture distributor (8) arranged in the screen drum (6) with a pusher base apparatus (9), with either the screen stage (7) or the pusher base apparatus (9) being arranged movably to and fro along the axis of rotation (5) such that the solid cake (3) is displaceable by means of the pusher base apparatus (9). The multi-stage centrifuge further includes an infeed device (10) with which the mixture (2) can be introduced via the mixture distributor (8) into an empty space (11) which arises on the displacement of the solid cake (3) by the pusher base apparatus (9), with the pusher base apparatus (9) including a pre-acceleration funnel (12) which extends in a substantially divergent manner in the direction towards the infeed device (10) and the pre-acceleration funnel (12) being designed as a pre-acceleration screen (12).

20 Claims, 13 Drawing Sheets

MULTI-STAGE PUSHER CENTRIFUGE

BACKGROUND OF THE INVENTION

The invention relates to a multi-stage pusher centrifuge for the separation of a mixture into a solid cake and into a liquid phase, including an outer screen drum rotatable about an axis of rotation and at least one screen stage arranged in the outer screen drum, a mixture distributor arranged in the screen drum with a pusher base apparatus, with either the screen stage or the pusher base apparatus being arranged movably along the axis of rotation such that the solid cake is displaceable by means of the pusher base apparatus, and including an infeed device with which the mixture can be introduced via the mixture distributor into an empty space which forms when the solid cake is displaced by the pusher base apparatus.

Centrifuges are widespread and are used in the most varied areas in the most varied embodiments for the drying of moist substances or of moist substance mixtures. Discontinuously operating centrifuges such as scraper centrifuges are thus preferably used, for example, for the drying of very pure pharmaceutical products, whereas continuously operating pusher centrifuges are advantageously used in particular when continuously large volumes of a solid/liquid mixture should be separated. Depending on requirements, single-stage or multi-stage pusher centrifuges as well as double pusher centrifuges are used.

In the different types of the last named class of pusher centrifuges, a solid/liquid mixture, for example a suspension or a moist salt or salt mixture, is supplied via a mixture distributor through an inlet tube to a fast rotating drum which is designed as a filter screen such that the liquid phase is separated through the filter screen due to the acting centrifugal forces, whereas a solid cake is separated at the interior at the drum wall. A substantially disc-shaped pusher base with a synchronized co-rotation is arranged in the rotating drum, with—depending on the number of screen stages—either the pusher base or a screen stage oscillating at a specific amplitude in the axial direction in the drum such that some of the dried solid cake is pushed out at an end of the drum. On the movement of the pusher base in the opposite direction, a region of the drum adjoining the pusher base is released which can then be again loaded with a new mixture through the inlet tube and via the mixture distributor. Depending on the type used, throughput volumes in an order of magnitude of 100 tons per hour can be reached without problem with modern heavy-duty pusher centrifuges, with drum diameters of up to 1000 mm and more being quite normal and typical rotational frequencies of the drum being able to be achieved, depending on the drum diameter, of up to 2000 revolutions per minute and more. Due to the high centrifugal forces which occur, a larger drum diameter as a rule results in a smaller maximum rotational frequency of the drum. The operating parameters such as the rotational frequency of the drum, the volume of mixture supplied per time unit or also the drum diameter or the type of pusher centrifuge used can also depend on the actual material to be dried, the liquid content, etc.

The multi-stage pusher centrifuges known from the prior art are as a rule continuously operating filter centrifuges. The multi-stage filter centrifuge consists of an outer screen drum and at least one screen stage which is arranged in the outer screen drum and is likewise designed as a screen drum. A plurality of screen stages can be arranged concentrically inside one another such that two-stage, three-stage and multi-stage pusher centrifuges can be realized, with all screen stages being driven very fast synchronously about a joint axis of rotation. In the operating state, a solid/liquid mixture to be separated continuously enters through a fixed-standing inlet tube into a mixture distributor which is arranged in the innermost screen stage and which likewise rotates co-synchronously and is uniformly distributed on the innermost screen stage over its whole screen periphery. The largest part of the liquid is already centrifuged off here and a solid cake is formed.

In a two-stage pusher centrifuge, the innermost stage, which is also termed a first stage, carries out an oscillation movement in the direction of the axis of rotation in addition to the rotational movement about the axis of rotation. This oscillatory movement is, for example, generated hydraulically via a pusher piston with a reversing mechanism. The solid cake is thereby pushed from the first stage to the second stage in ring sections, corresponding to the stroke length of the oscillation, and ultimately exits the pusher centrifuge via a discharge opening. In practice, the solid cake is continuously washed in the screen drum while feeding washing liquid onto the solid cake.

A known two-stage pusher centrifuge which works in accordance with the aforementioned principle is described in detail, for example, in DT 25 42 916 A1. In two-stage and multi-stage pusher centrifuges, the first stage, i.e. the innermost screen stage, substantially serves for the pre-dewatering of the mixture as well as for the forming of a solid cake, whereas the outer screen drum mainly serves as a drying stage. Since a pre-dewatering is possible by means of the first screen stage, a much higher liquid absorption capacity is achieved with multi-stage pusher centrifuges so that mixtures with lower inlet concentrations, i.e. with a higher liquid content, can be processed.

For special areas of application, special versions of two-stage and multi-stage pusher centrifuges are known, in particular for highly abrasive centrifuge goods such as coal and raw phosphate, which require special abrasion protection measures such as abrasive-resistant screens. Special designs for intensive washing processes and for the carrying out of special washing methods such as counter-flow washing for nitro-cellulose are also known from the prior art. Gas-impermeable versions of multi-stage pusher centrifuges are also used for operation under an inert gas atmosphere.

Although multi-stage pusher centrifuges such as briefly outlined above have also been well known for special applications in the most varied variants for a long time, the known multi-stage pusher centrifuges nevertheless show different serious disadvantages. Even if lower inlet concentrations, i.e. mixtures with an increased liquid content, can be processed better with the known multi-stage pusher centrifuges than with customary single-stage pusher centrifuges, the inlet concentration of the mixture to be processed may not have any desired low degree. I.e. when the share of liquid in the mixture is too high, for example amounts to 50% or 70% or 80% or even more than 90% liquid phase, the mixture must be pre-condensed in more or less complex processes. With too high a liquid content, a uniform distribution of the mixture to be dried over the periphery of the screen drum is made increasingly difficult. This can result, on the one hand, in very damaging vibrations of the screen drum and thus to premature wear of bearings and the drive; in the worst case even to a safety problem in operation. On the other hand, a solid cake distributed unevenly over the periphery of the screen drum brings about problems in washing. Static condensers, arc screens or the very well known hydrocyclones are therefore available, for example, for the pre-dewatering. It is obvious that the use of such pre-dewatering systems is very complex and thus expensive both from a process and an apparatus point of view.

A further serious disadvantage in the processing of mixtures of a smaller inlet concentration consists of practically the whole volume of liquid supplied with the mixture having to be accelerated to the full peripheral speed before it is separated through the filter screen of the screen drum. The same applies to very small particles in the mixture which should likewise be separated from the solid cake through the screen. This is extremely unfavorable energetically and has a clearly negative influence on the operating behavior of the centrifuge.

But even in the processing of mixtures with a much higher solid concentration, the centrifuges known from the prior art have some huge disadvantages. For instance, the mixture introduced into the mixture distributor through the inlet tube is accelerated in a very short time up to the full peripheral speed of the drum on impacting the screen drum. This can result, among other things, in grain breakage, in particular with sensitive substances; that is, for example, solid grains which are distributed in a suspension supplied to the centrifuge burst into smaller pieces in an uncontrolled manner on the abrupt acceleration process, which can have negative influences on the quality of the solid cake produced when, for example, the particle size of the grains in the end product plays a role.

SUMMARY OF THE INVENTION

It is therefore an object of the present invention to provide an improved multi-pusher centrifuge which largely avoids the disadvantages known from the prior art.

In accordance with the invention, a multi-stage pusher centrifuge is provided for the separation of a mixture into a solid cake and into a liquid phase. The multi-stage pusher centrifuge includes an outer screen drum rotatable about an axis of rotation and at least one screen stage arranged in the outer screen drum, a mixture distributor arranged in the screen drum and having a pusher base apparatus, with either the screen stage or the pusher base being arranged and designed movably to and fro along the axis of rotation such that the solid cake can be displaced using the pusher base apparatus. The multi-stage pusher centrifuge further includes an infeed device with which the mixture can be introduced via the mixture distributor into an empty space which arises when the solid cake is displaced by the pusher base apparatus, with the pusher base apparatus including a pre-acceleration funnel which extends substantially divergently in the direction toward the infeed device and the pre-acceleration funnel being designed as a pre-acceleration screen.

Since the multi-state pusher centrifuge in accordance with the invention has a pre-acceleration screen arranged at the pusher base apparatus, the total amount of liquid phase contained in the supplied mixture does not have to be accelerated to the full peripheral speed of the screen drum, since some of the liquid phase is already separated via the pre-acceleration screen and can be removed from the screen drum. Mixtures with a very high liquid content can thus also be processed without problem. In particular, a uniform distribution of the mixture to be dried over the peripheral surface of the screen stage or of the screen drum is thus also always ensured even with a high liquid content.

Furthermore, it is prevented by the pre-acceleration funnel designed as a pre-acceleration screen that a mixture introduced into the mixture distributor directly through the infeed device substantially only enters onto the inner peripheral surface of the screen stage under the influence of gravity and without pre-acceleration. The incoming mixture is rather accelerated in a slowed manner to the peripheral speed of the screen drum, whereby in particular grain breakage and other damaging influences such as occur on the abrupt acceleration in the multi-stage pusher centrifuges known from the prior art can be avoided. A bursting of solid grains contained in the mixture can thus be avoided by the multi-stage pusher centrifuge in accordance with the invention, because the acceleration process can be controlled via the pre-settable pre-acceleration angle of the pre-acceleration funnel, i.e. in that the acceleration itself can be set by a suitable choice of the pre-acceleration angle of the pre-acceleration funnel. The quality of the solid cake produced, in particular with products in which the particle size or the shape of the grains in the end product, for example, play a role, can be substantially increased.

The important components and the basic function of a multi-stage centrifuge are known from the prior art such that in the following reference can be made primarily to only the features material to the invention.

The multi-pusher centrifuge in accordance with the invention serves for the separation of a mixture into a solid cake and into a liquid phase and includes as material components an outer screen drum which is rotatable about an axis of rotation via a drum axle and is accommodated in a housing. The drum axle is actively connected to a drum drive such that the screen drum can be set into fast rotation about the axis of rotation by the drum drive. At least one screen stage is arranged inside the outer screen drum. Furthermore, a mixture distributor having a pusher base apparatus is provided in the screen drum, with either the screen stage and/or the pusher base apparatus being arranged movably to and fro along the axis of rotation such that the solid cake is displaceable by means of the pusher base apparatus. Both the outer screen drum and the screen stage have screen openings through which liquid phase can be drained to the outside from the solid cake or from a mixture by the centrifugal forces which occur in a known manner at fast rotation, the mixture being able to be applied onto an inner peripheral surface of the screen stage. In particular, in an example especially important for practice, the screen drum and/or the screen stage can be designed in a manner known per se as a skeleton-like support drum which is lined with special filter foils at their peripheries to form the corresponding screen areas; i.e. the skeleton-like support drum can, for example, be made with one or more filter screens having filter openings of different or equal size for the separation of the liquid phase.

The mixture distributor having the pusher base apparatus is arranged inside the screen drum which allows mixture supplied continuously through the infeed device to be distributed onto the inner peripheral surface of the screen stage by being introduced into the empty space which arises on the displacement of the solid cake. The pusher base apparatus includes a pre-acceleration funnel which is designed as a pre-acceleration screen in accordance with the invention, with the pre-acceleration screen extending substantially divergently in the direction toward the infeed device. The pre-acceleration funnel is designed as a ring region at a peripheral region such that the solid cake deposited in the screen stage is displaceable with the ring region by an oscillation of the pusher base apparatus or of the screen stage into the screen drum or into a further screen stage.

The mixture distributor is preferably coupled to the screen drum in a manner known per se by fastening means and therefore rotates in a specific embodiment synchronously with the screen drum and the screen stage about the common axis of rotation. The oscillatory movement is carried out, in dependence on the number of screen stages present, either by the screen stage itself or by the pusher base apparatus. There is thus an oscillatory relative movement between the screen stage and the pusher base apparatus having a pre-acceleration funnel in the operating state. The drive of the oscillatory movement preferably takes place via a pusher rod, with the solid cake deposited on the screen stage being pushed in ring sections, whose width is determined by the stroke length of the oscillation movement, from the screen stage to the screen drum or to a further screen drum with the outer ring region in a first half-period of the oscillatory movement, and a ring section of solid cake deposited at the outer rim of the screen drum being pushed out of the screen drum in a second half-period of the oscillatory movement. During the second half-period of the oscillatory movement, an empty space simultaneously arises at the outer ring region in the screen stage such that new mixture can be introduced into the empty space.

It is important for the multi-stage pusher centrifuge in accordance with the invention that some of the liquid phase can already be separated from the mixture in the pre-acceleration screen and the mixture can be pre-accelerated to a pre-settable rotational speed in the pre-acceleration screen such that the mixture introduced from the infeed device can be accelerated to a pre-settable peripheral speed before reaching the peripheral surface of the screen stage. On the one hand, the total amount of liquid phase contained in the mixture thereby does not have to be accelerated to the full peripheral speed of the screen drum so that mixtures with a very high liquid content can also be processed without problem. Even with very high concentrations of liquid phase in the mixture, additional devices for the pre-dewatering such as static condensers, arc screens or hydrocyclones are in particular superfluous.

On the other hand, since the pre-acceleration funnel has an opening angle with respect to the axis of rotation which is smaller than 90°, the flow speed of the mixture in the pre-acceleration funnel can be directly set in comparison to the speed in free-fall in the direction towards the peripheral surface of the screen stage such that the mixture can be accelerated gradually in the region of the pre-acceleration funnel as it approaches the outer ring region both in the radial direction and in the peripheral direction of the screen drum. This means that the mixture is accelerated in a particularly gentle manner gradually to the pre-settable peripheral speed in the region of the pre-acceleration funnel in order to finally reach the full rotational speed of the screen stage on reaching the peripheral surface.

Both an inlet funnel, whose function will be explained in detail further below, and the pre-acceleration funnel preferably extend in a pre-settable region at a substantially constant pre-acceleration angle or at a constant pre-acceleration angle in a conically divergent manner in the direction towards the pusher base apparatus or towards the infeed device.

For specific applications, for example in dependence on the properties of the mixture to be dewatered, the inlet funnel and/or the pre-acceleration funnel can, however, also have a curved extent in a pre-settable region, with the opening angle of the inlet funnel and/or the pre-acceleration angle of the pre-acceleration funnel becoming larger or smaller in the direction towards the pusher base apparatus. This can in particular be of advantage when the inlet funnel or the pre-acceleration funnel is formed, as will be described more precisely below, as a pre-filter screen or as a pre-acceleration screen for the pre-separation of liquid phase.

In a specific embodiment, the pre-acceleration screen is designed as a two-stage filter with a coarse filter and a fine filter. The mixture can thereby be filtered in two stages in the region of the pre-acceleration screen. The design of the pre-acceleration screen as a two-stage filter in particular has the advantage that the fine filter is not mechanically strained as much by large and/or heavy particles contained in the incoming mixture so that the fine filter can have, for example, very small pores for the filtering of very small particles and can in particular be made of materials with mechanically low resistance.

It is of particular importance for practice for a collection apparatus to be provided at the mixture distributor for the draining of liquid phase such that some of the liquid phase can already be removed before reaching the enormously fast rotating peripheral surface of the screen stage. This part of the liquid phase is then no longer accelerated to the full peripheral speed of the screen stage, which results in a huge saving of energy and in the relief of components, in particular of the rotating and/or oscillating components of the multi-stage pusher centrifuge. Even mixtures with an extremely high liquid content can thereby be processed without problem.

In a further embodiment of the multi-stage pusher centrifuge in accordance with the invention, the pre-acceleration screen is designed and arranged such that the pre-acceleration screen can be rotated at a pre-settable speed of rotation about an axis of rotation by means of a rotational drive irrespective of the speed of rotation of the screen drum. Suitable means are preferably provided, for example in the form of computer-aided electronic systems for the control and/or regulation of the rotational speed of the rotational drive, in order to control and/or regulate the rotational drive, for example in dependence on suitable operating parameters of the multi-stage pusher centrifuge.

In another preferred embodiment of a multi-stage pusher centrifuge in accordance with the invention, an inlet funnel is additionally provided in the infeed device for the pre-acceleration of the incoming mixture. The mixture moves through the infeed device first into an inlet funnel which is, preferably in one embodiment, but not necessarily, rotationally fixedly connected to the mixture distributor such that the inlet funnel rotates synchronously with the mixture distributor. The inlet funnel extends divergently in the substantially axial direction towards the pre-acceleration screen such that the mixture supplied through the infeed device enters directly into the inlet funnel. The inlet funnel is designed and arranged such that the mixture can be fed into the pre-acceleration screen on exiting the inlet funnel.

Due to the arrangement and to the design of the inlet funnel, the mixture is already pre-accelerated to a pre-settable rotational speed in the inlet funnel so that the mixture already has a certain speed in the peripheral direction of the screen stage on entering the pre-acceleration screen and thus can be accelerated even more gently overall to the maximum peripheral speed of the peripheral surface of the screen stage.

The inlet funnel can preferably also be made as a pre-filter screen for the pre-separation of liquid phase from the mixture. Collection means are preferably provided for the collection and draining of liquid phase separated by the pre-filter screen.

A value of an opening angle of the inlet funnel and/or the value of a pre-acceleration angle of the pre-acceleration funnel with respect to the axis of rotation can lie, for example, between 0° and 45°, individually between 0° and 100 or between 10° and 45°, in particular between 25° and 45°, preferably between 15° and 35°. It is in specific cases also possible for the value of the opening angle and/or of the pre-acceleration angle to be larger than 45°. It can very generally be said that as a rule an acute angle is more of advantage with respect to the axis of rotation, with an optimum value of the corresponding opening angle and/or of the pre-acceleration angle being determined inter alia by the value of a static friction angle of the product to be dewatered.

In particular when, but not only when, the inlet funnel is made as a pre-filter screen for the pre-separation of liquid phase, it can be of particular advantage for the inlet funnel to have a curved extent and for the opening angle of the inlet funnel to become larger or smaller in the direction towards the pusher base apparatus. It is known that different products can have different levels of dewatering under operating conditions of the pusher centrifuge which are otherwise the same, for example in dependence on the grain size and/or on the viscosity and/or on other properties or parameters such as on the temperature of the mixture.

If, for example, a mixture is present which is relatively easy to dewater under given operating parameters, it can be of advantage for the inlet funnel or the pre-filter screen to have a curved extent, with the opening angle of the pre-filter screen becoming larger in the direction towards the pusher base apparatus. This means that the inlet funnel or the pre-filter screen diverges in the direction towards the pusher base apparatus similar to the horn of a trumpet. The driving force at which the mixture is accelerated out of the inlet funnel thus becomes disproportionately larger as the spacing to the pusher base apparatus decreases such that the mixture which is already relatively highly dewaterable in the pre-filter screen and thus shows poor slide properties in the pre-filter screen can exit the pre-filter screen faster than, for example, with a pre-filter screen diverging in substantially cone-shape with a constant opening angle.

On the other hand, mixtures can also be present which are relatively difficult to dewater under given operating parameters. In this case, it is recommended to use an inlet funnel or a pre-filter screen with a curved extent, with the opening angle of the pre-filter screen becoming smaller in the direction towards the pusher base apparatus. This has the consequence that the driving force with which the mixture is accelerated out of the inlet funnel increases more slowly as the spacing towards the pusher base apparatus decreases than, for example, with an inlet funnel diverging conically at a substantially constant opening angle. A certain congestion effect thereby occurs in the pre-acceleration screen such that the mixture remains longer in the pre-filter screen and is therefore already dewaterable to a higher degree in the pre-filter screen.

In a very analogous manner to the aforesaid, the pre-acceleration funnel can also have a curved extent, with the pre-acceleration angle of the pre-acceleration funnel becoming larger or smaller in the direction towards the infeed device.

The advantages previously explained in connection with the curved inlet funnel and the function thereof are easily analogously transferable to a curved pre-acceleration funnel by the person skilled in the art and therefore do not need to be repeated here.

Furthermore, in a specific embodiment, the pre-filter screen can also be designed as a two-stage screen with a coarse screen and with a fine screen. The advantages are obvious. The first filter stage is formed by the coarse screen which keeps back particles contained in the mixture which are larger than the filter openings of the coarse screen. The fine screen keeps back correspondingly finer particles, whereas at least part of the liquid phase, as well as very small particles which likewise have to be removed, can be drained directly from the screen stage. The design of the pre-filter screen as a two-stage screen in particular has the advantage that the fine screen is not put under such strong mechanical strain by large and/or heavy particles contained in the incoming mixture so that the fine screen can, for example, have very small pores for the filtration of very small particles and can in particular also be made of materials which are mechanically less resistant.

In particular, in an embodiment especially important for practice, the inlet funnel and/or the pre-acceleration funnel can be designed as a skeleton-like support body which can be fitted with special filter foils for the formation of the pre-filter screen and/or of the pre-acceleration screen; i.e. the skeleton-like support body can, for example, be equipped with one or more filter screens which can possibly have differently sized filter openings for the separation in different stages.

Separator screens or, for example, sheet metal screens can be used, among other things, quite generally as filter screens. The filter screens can advantageously be provided in different manners with filter openings of different sizes. In particular, the aforesaid sheet metal screens can be stamped, drilled, lasered, electron beam punched or water jet cut, among other things, with generally other techniques also being possible. The screens themselves can, depending on the demand, be produced from different materials, in particular corrosion-resistant materials, such as plastic, composite materials or different steels such as 1.4462, 1.4539 or 2.4602 or from other suitable materials. For protection against wear, the filter screens can furthermore be provided with suitable layers, for example be hardened with hard chromium layers, tungsten carbide (WC), ceramics or in other ways. The thickness of the filter sheet metals typically amounts to 0.2 mm to 5 mm, with much different sheet metal thicknesses also being possible.

It can be of great importance in practice to directly control the acceleration process itself or the rotational speed to which the mixture can be accelerated in the inlet funnel. The inlet funnel can therefore be arranged rotationally about a drive axis and be rotatable at a pre-settable speed about the drive axis by means of a drive. For the control and/or regulation of the rotational speed of the inlet funnel, this is, for example, rotationally fixedly connected to a separate drive axle and can be driven via the drive axle by means of a drive independently of the screen drum and/or independently of the pre-acceleration screen at a pre-settable rotational frequency. As already described above for the drive of the pre-acceleration screen, suitable means can be provided to control and/or to regulate the drive, for example in dependence on the mixture to be processed, on specific operating parameters of the multi-stage pusher centrifuge, etc. For this purpose, the multi-stage pusher centrifuge in accordance with the invention can also include corresponding sensors for the measurement of relevant operating parameters.

It is understood that the features of the particularly preferred embodiments of the multi-stage pusher centrifuge in accordance with the invention previously described by way of example can also be combined as desired in an advantageous manner depending on the demand.

The invention will be explained in the following in more detail with reference to the schematic drawing.

DESCRIPTION OF THE PREFERRED EMBODIMENTS

Figure 1:
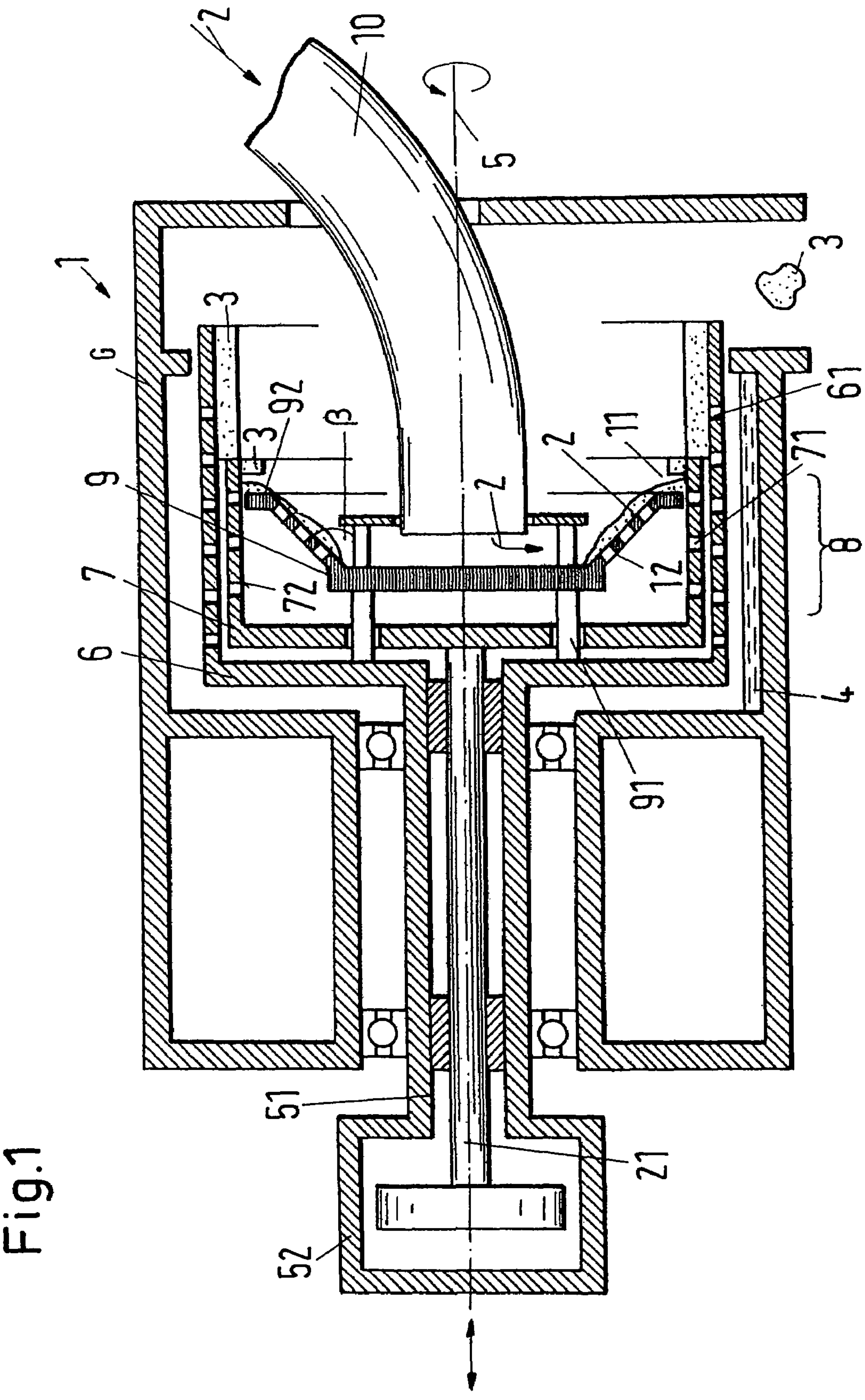
FIG. 1 shows, in section, a multi-stage pusher centrifuge with a pre-acceleration screen.

FIG. 1 shows, in section in a schematic representation, important components of a first embodiment of a multi-stage pusher centrifuge in accordance with the invention with a pre-acceleration screen. In the drawings of the present applications, for reasons of clarity, only two-stage pusher centrifuges are shown schematically by way of example. It is understood that the illustration of two-stage pusher centrifuges is to be understood as an example and that the description also applies to pusher centrifuges with more than two stages and can be transferred correspondingly.

The multi-stage pusher centrifuge in accordance with the invention, which will be designated as a whole in the following with the reference numeral 1, serves for the separation of a mixture 2 into a solid cake 3 and into a liquid phase 4 and includes as important components an outer screen drum 6 which is rotatable via a drum axle 51 about an axis of rotation 5 and is accommodated in a housing G. The drum axle 51 is in effective connection with a drum drive 52 such that the screen drum 6 can be set into fast rotation about the axis of rotation 5 by the drum drive 52. At least one screen stage 7 is arranged inside the outer screen drum 6. Furthermore, a mixture distributor 8 with a pusher base apparatus 9 is provided in the screen drum 6, with either the screen stage 7 or the pusher base apparatus 9 being arranged movably to and fro along the axis of rotation 5 such that the solid cake 3 can be displaced by means of the pusher base apparatus 9. Both the outer screen drum 6 and the screen stage 7 have screen openings 61, 71 through which liquid phase 4 can be drained outwardly in a known manner by the centrifugal forces which occur at a fast rotation from the solid cake 3 or from the mixture 2 which, as will be described in more detail further below, can be applied to an inner peripheral surface 72 of the screen stage 7.

The mixture distributor 8 with a pusher base apparatus 9 is arranged inside the screen drum 6 and allows mixture 2 continuously supplied by the infeed device 10 to be distributed onto the inner peripheral surface 72 of the screen stage 7 by introduction into an empty space 11 which arises on the displacement of the solid cake 3. The pusher base apparatus 9 includes a pre-acceleration funnel 12 which is designed as a pre-acceleration screen 12, with the pre-acceleration screen 12 extending in a substantially conically divergent manner in the direction towards the infeed device 10. The pre-acceleration funnel 12 is formed as a ring section 92 at a peripheral region such that the solid cake 3 deposited in the screen stage 7 is displaceable with the ring region 92 by an oscillation of the pusher base apparatus 9 described further below and/or of the screen stage 7 into the screen drum 6 or into a further screen stage 7 not shown here.

It is important for the multi-stage pusher centrifuge 1 in accordance with the invention that some of the liquid phase 4 can already be separated from the mixture 2 in the pre-acceleration screen 12 and the mixture 2 can be pre-accelerated to a pre-settable rotational speed in the pre-acceleration screen 12.

The mixture distributor 8 is rigidly coupled in the embodiment shown in FIG. 1 to the screen drum 6 by fastening means 91 and therefore rotates synchronously about the axis of rotation 5 with the screen drum 6 and the screen stage 7. The oscillatory movement, which is indicated by the double arrow in FIG. 1, is carried out in the example shown here, however, only by the screen stage 7. In the operating state, there is thus an oscillatory relative movement between the oscillating screen stage 7 and the pusher base apparatus 9, with the pre-acceleration funnel 12, immovable in the axial direction. The oscillatory movement of the screen stage 7 preferably takes place via a pusher rod 21, with the solid cake 3 deposited on the screen stage 7 being pushed in ring sections, whose width is determined by the stroke length of the oscillation movement of the screen stage 7, from the screen stage 7 with an outer ring region to the screen drum 6 in a first half-period of the oscillatory movement, and a ring section of solid cake 3 deposited at the outer rim of the screen drum 6 being pushed out of the screen drum 6 in a second half-period of the oscillatory movement by the screen stage 7. During the second half-period of the oscillatory movement, the empty space 11 simultaneously arises in the screen stage 7 such that new mixture can be introduced into the empty space 11.

It is important for the multi-stage pusher centrifuge 1 in accordance with the invention that some of the liquid phase 4 can already be separated from the mixture 2 in the pre-acceleration funnel 12 and the mixture 2 can be pre-accelerated to a pre-settable rotational speed in the pre-acceleration funnel 12 such that the mixture 2 introduced from the infeed device 10 can be accelerated to a pre-settable peripheral speed before reaching the screen stage 7. On the one hand, the total amount of liquid phase 4 contained in the mixture 2 thereby does not have to be accelerated to the full peripheral speed of the screen drum 6, since some of the liquid phase 4 is already separated via the pre-acceleration screen 12 and can be separated directly from the screen drum 6 through the screen openings 61, 71. Mixtures 2 with a very high content of liquid phase can thus also be processed without problem. A uniform distribution of the mixture 2 to be dried over the peripheral surface 72 of the screen stage 7 or of the screen drum 6 can thus always in particular be ensured even with a high content of liquid phase 4. Even with very high concentrations of liquid phase 4 in the mixture 2, additional devices for the pre-dewatering such as static condensers, arc screens or hydrocyclones are in particular superfluous. Even the smallest particles contained in the mixture 2 can also be separated more effectively from the solid cake 3 by the effect of the pre-filtration.

Moreover, since the pre-acceleration funnel 12 has a pre-acceleration angle β which is smaller than 90°, the flow speed of the mixture 2 in the pre-acceleration funnel 12 can be directly set in comparison to the speed in free-fall in the direction towards the peripheral surface 72 of the screen stage 7 such that the mixture 2 can be accelerated gradually in the region of the pre-acceleration funnel 12 as it approaches the outer ring region 92 both in the radial direction and in the peripheral direction of the screen drum 6. This means that the mixture 2 is accelerated in a particularly gentle manner gradually to a pre-settable peripheral speed in the region of the pre-acceleration screen 12 in order to finally reach the full rotational speed of the screen stage 7 on reaching the peripheral surface 72.

The value of the pre-acceleration angle β of the pre-acceleration funnel 12 and the value of an opening angle α of an inlet funnel 16 to be described later can lie, for example, with respect to the axis of rotation 5 between 0° and 45°, individually between 0° and 10° or between 10° and 45°, in particular between 25° and 45°, preferably between 15° and 35°. It is in specific cases also possible for the value of the opening angle α and/or of the pre-acceleration angle β to be larger than 45°. It can very generally be said that as a rule an acute angle is more of advantage with respect to the axis of rotation 5, with an optimum value of the corresponding opening angle α and/or of the pre-acceleration angle β being determined inter alia by the value of the static friction angle of the mixture 2 to be dewatered.

Since the mixture 2, unlike with the multi-stage pusher centrifuges known from the prior art, is not accelerated abruptly in the region of the pre-acceleration screen 12, i.e. in a very short time, to the full rotational speed of the screen stage 7, grain breakage and other damaging effects on the mixture 2 can, for example, be avoided. In particular, mechanically very sensitive substances can thus also be processed even at extremely high rotational speeds of the screen drum 6 in the multi-stage pusher centrifuge 1 in accordance with the invention.

Figure 2:
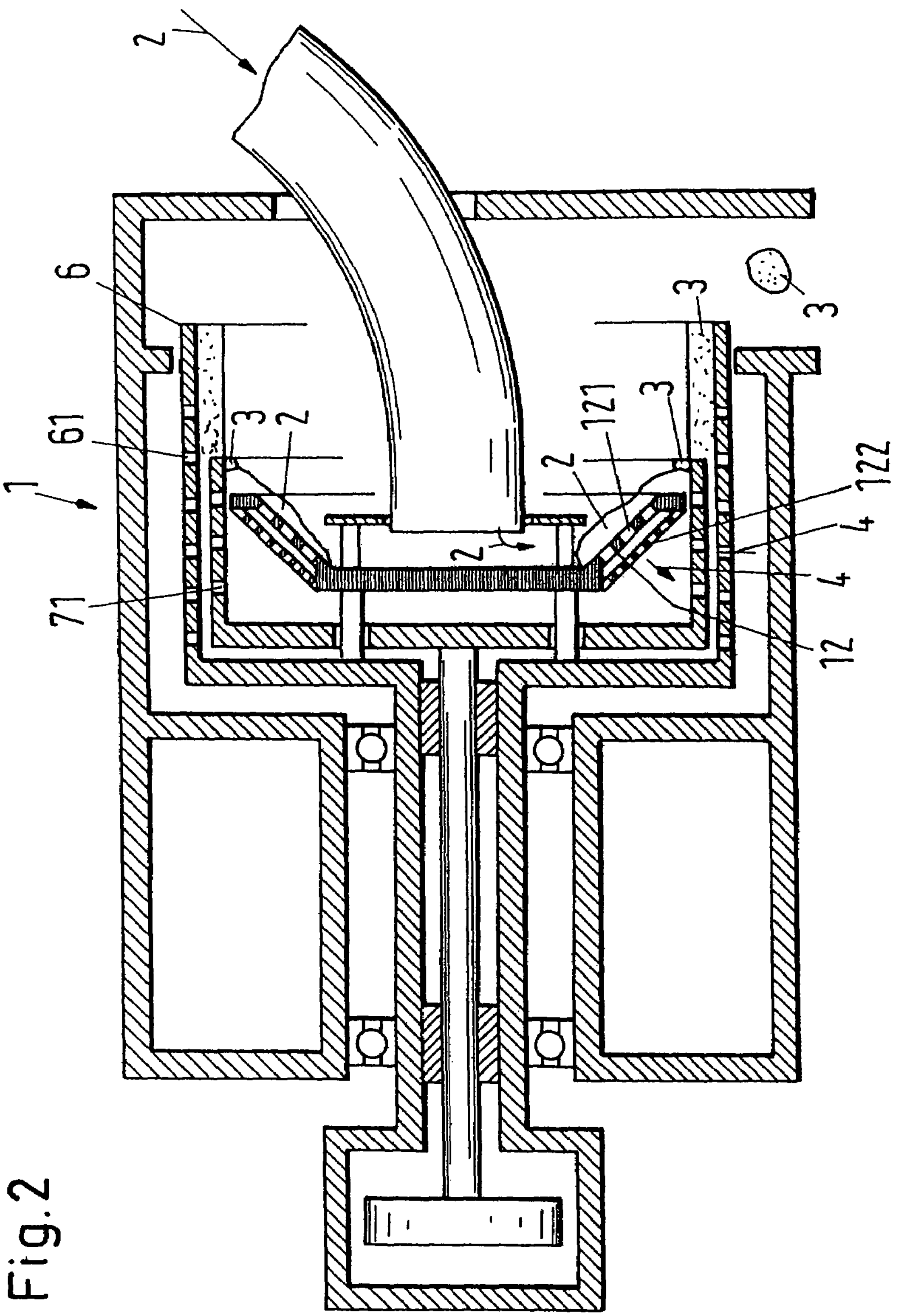
FIG. 2 shows a further embodiment in accordance with FIG. 1 with a two-stage filter.

A further embodiment in accordance with FIG. 1 is shown in FIG. 2, with the pre-acceleration screen 12 being designed as a two-stage filter with a coarse filter 121 and a fine filter 122. The mixture 2 can thereby be filtered in two stages in the region of the pre-acceleration screen 12. The first filter stage is formed by the coarse filter 121 which holds back particles contained in the mixture which are larger than the filter openings of the coarse filter 121 which can thus be introduced into the empty space 11. The fine filter 122 holds back correspondingly fine particles which can likewise be supplied to the empty space 11 and thus to the solid cake 3, whereas at least some of the liquid phase 4, as well as very small particles which likewise have to be removed, can be drained from the screen drum 6 directly through a screen opening 61, 71. The design of the pre-acceleration screen 12 as a two-stage filter in particular has the advantage that the fine filter 122 is not mechanically strained as much by large and/or heavy particles which can be contained in the incoming mixture 2 so that the fine filter 122 can have, for example, very small pores for the filtering of very small particles and can in particular be made of materials with mechanically low resistance.

Figure 3:
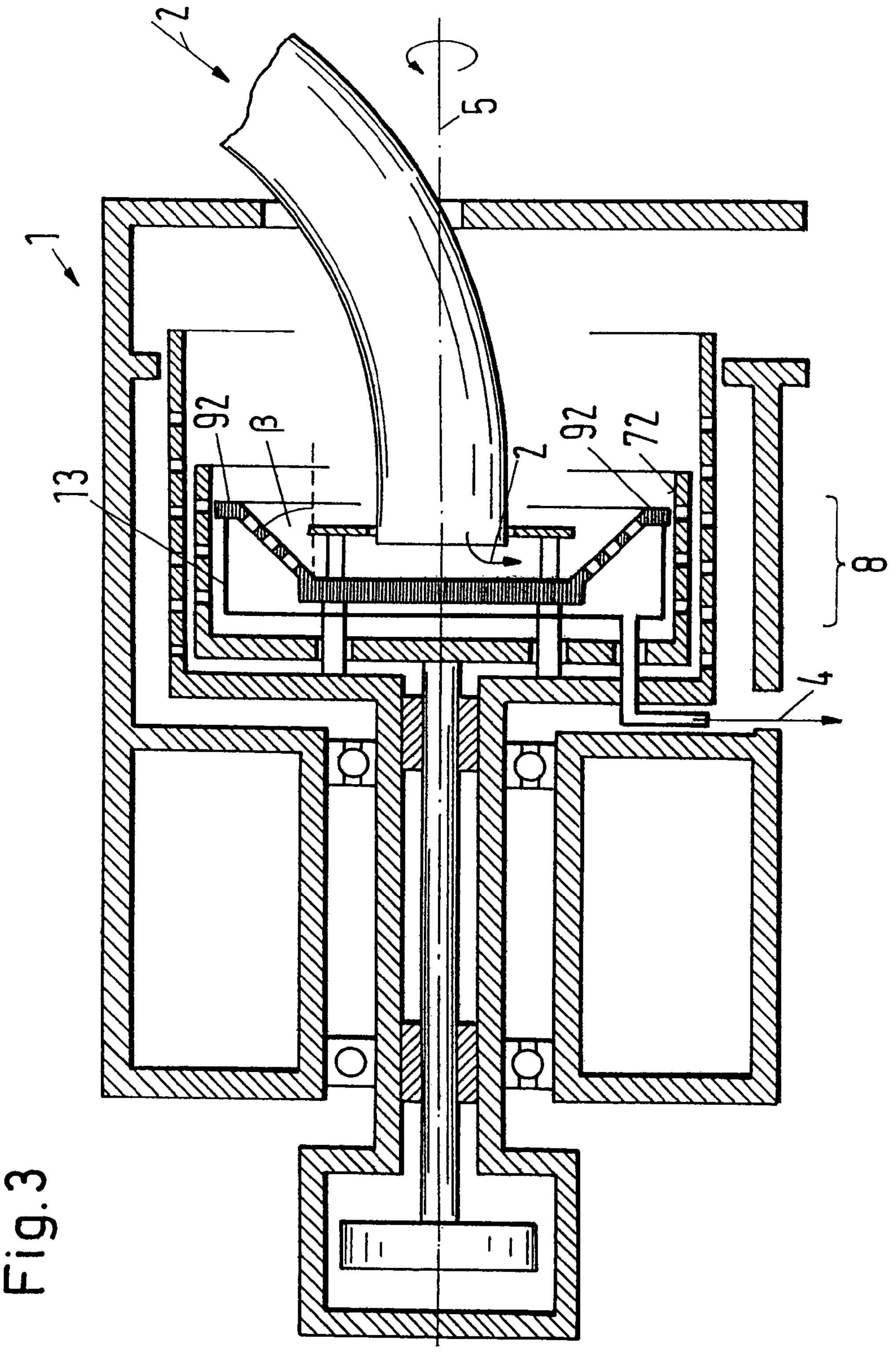
FIG. 3 shows another embodiment in accordance with FIG. 1 with a collection device for the draining of liquid phase.

It is of particular importance for practice for, as shown schematically in FIG. 3, a collection apparatus 13 to be provided at the mixture distributor 8 for the draining of liquid phase 4 such that some of the liquid phase 4 can already be removed before reaching the very fast rotating peripheral surface 72 of the screen stage 7. This part of the liquid phase 4 is then no longer accelerated to the full peripheral speed of the screen stage 7, which results in a huge saving of energy and in the relief of components, in particular of the rotating and/or oscillating components of the multi-stage pusher centrifuge 1. Even mixtures 2 with an extremely high liquid phase 4 can thereby be processed without problem. It is understood that in the embodiment shown in FIG. 3, the pre-acceleration screen 12 can also be made as a two-stage filter and the liquid phase 4 separated at the pre-acceleration screen 12 can also be drained to the right in accordance with the illustration through the open side of the screen drum 6 in that, for example, the collection device 13 extends over the outer ring region to the right in accordance with the illustration into the screen stage 7 from where the liquid phase separated at the pre-acceleration screen 12 into the collection device 13 can be sucked off, for example, by suitable apparatuses not shown in FIG. 3.

Figure 4:
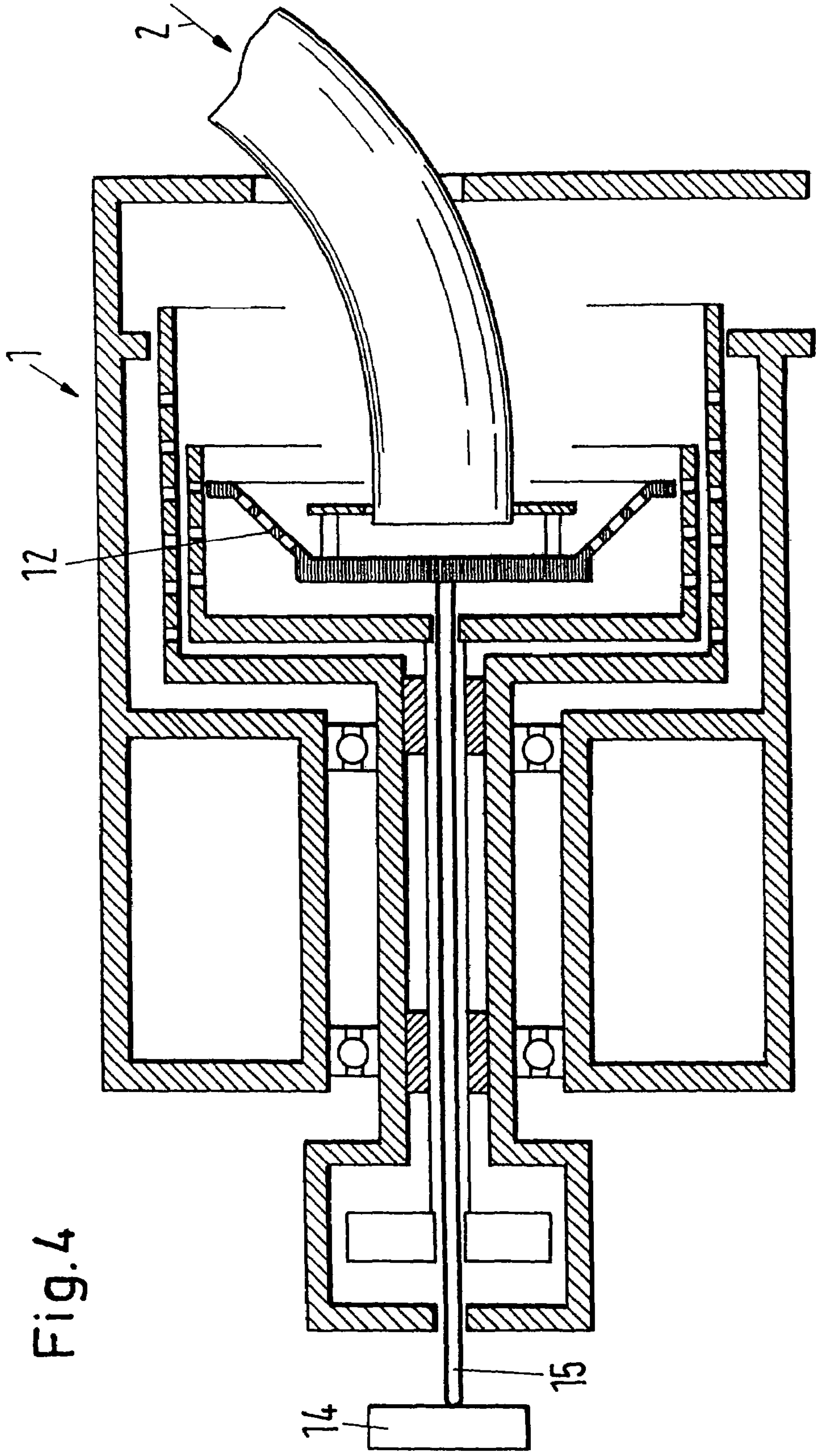
FIG. 4 shows a multi-stage pusher centrifuge with a separately drivable pre-acceleration funnel.

A variant of a multi-stage pusher centrifuge 1 in accordance with the invention is shown in FIG. 4 with a separately drivable pre-acceleration screen 12. The pre-acceleration screen 12 is designed and arranged here such that the pre-acceleration screen 12 is rotatable at a pre-settable speed of rotation about a rotational axle 15 by means of a rotational drive 14. The rotational axle 15, as shown by way of example in FIG. 4, can be arranged inside the pusher rod 21 and can be driven independently of this by the rotational drive 14. Suitable means, not shown here, can be provided for the control and/or regulation of the rotational speed of the rotational drive 14 in order to control and/or regulate the rotational drive 14, for example in dependence on suitable operating parameters of the multi-stage pusher centrifuge 1 or in dependence on the mixture to be processed or on other factors.

Preferably, but not necessarily, the pre-acceleration funnel 12, that is, the pre-acceleration screen 12, can, for example, rotate at a different rotational speed in one direction of the oscillation movement than with the opposite oscillation movement. The rotational frequency can thus, for example, be chosen on the displacement of the solid cake 3 such that the pre-acceleration funnel 12 rotates synchronously with the outer screen drum 6 so that no relative movement is present with respect to the rotation about the axis of rotation 5 on the displacement between the outer ring region 92 and the solid cake 3 which is deposited on the peripheral surface 72 of the screen stage 7, whereas on the return movement, that is, in the phase of the oscillation movement in which the empty space 11 is loaded with new mixture 2, the pre-acceleration funnel 12 rotates more slowly, for example, than the outer screen drum 6 or more slowly than the screen stage 7.

Figure 5:
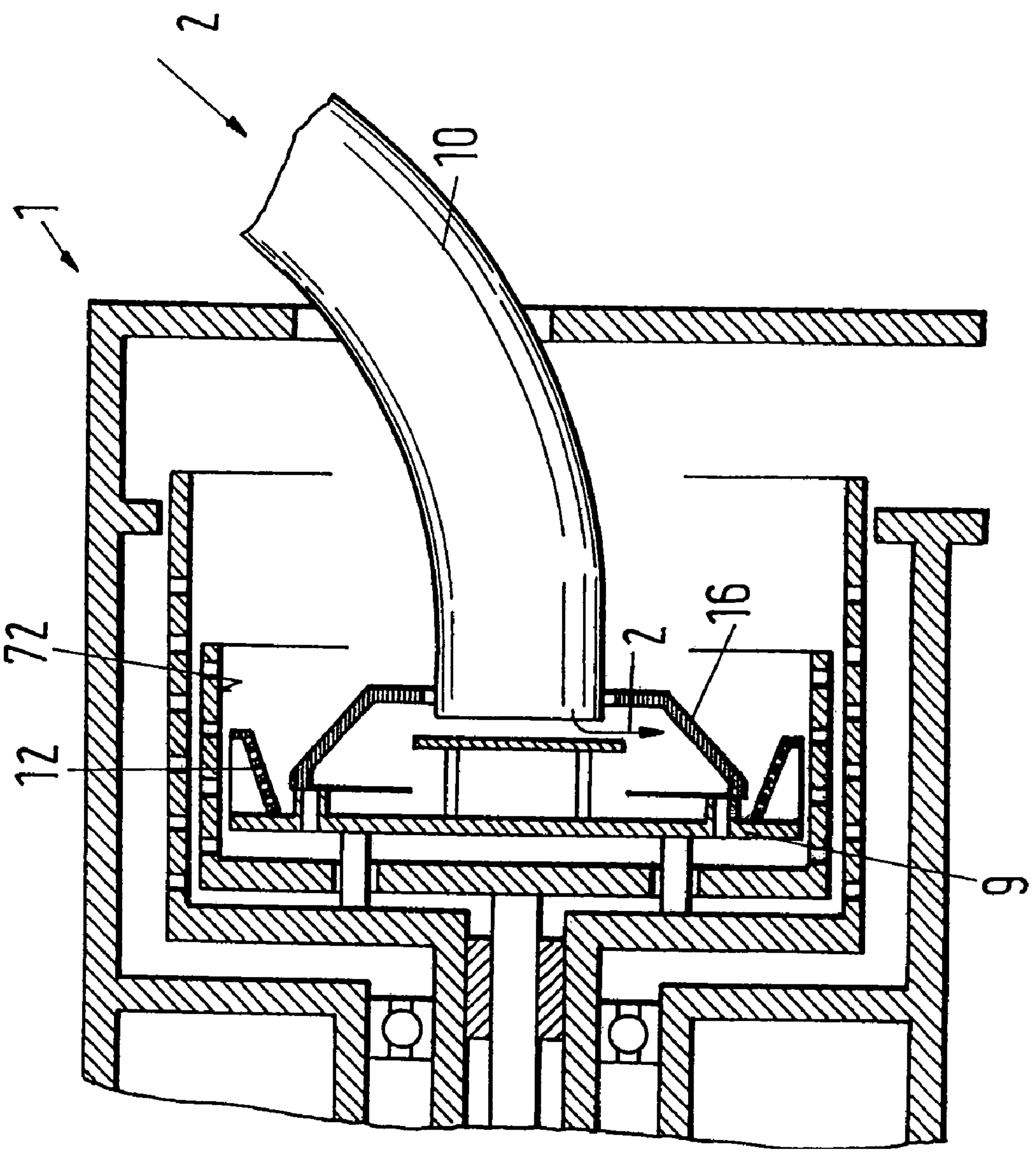
FIG. 5 shows a multi-stage pusher centrifuge with an inlet funnel.

A further embodiment of a multi-stage pusher centrifuge 1 in accordance with the invention is shown in FIG. 5. In this embodiment, an inlet funnel 16 is provided in the infeed device 10 for the pre-acceleration of the mixture 2. The mixture 2 moves through the infeed device 10 first into the inlet funnel 16 which is rotationally fixedly connected to the mixture distributor 8 such that the inlet funnel 16 rotates synchronously with the mixture distributor 8. The inlet funnel 16 extends in the substantially axial direction and in a conically divergent manner towards the pre-acceleration screen 12 such that the mixture 2 supplied through the infeed device 10 enters directly into the inlet funnel 16. The inlet funnel 16 is designed and arranged such that the mixture 2 can be fed into the pre-acceleration screen 12 on exiting the inlet funnel 16.

Since the inlet funnel 16 extends in a substantially conically divergent manner in the direction towards the pre-acceleration screen 12 and the inlet funnel 16 rotates synchronously, the mixture 2 is already pre-accelerated to a pre-settable rotational speed in the inlet funnel 16 such that the mixture 2 already has a specific speed in the peripheral direction of the screen stage 7 on entering the pre-acceleration screen 12 and thus can be accelerated even more gently overall to the maximum peripheral speed of the peripheral surface 72 of the screen stage 7.

Figure 5A:
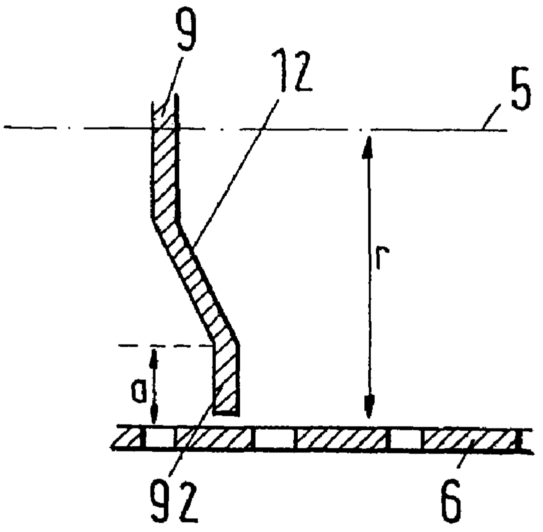
FIG. 5*a* shows an embodiment of a pre-acceleration funnel.
Figure 5B:
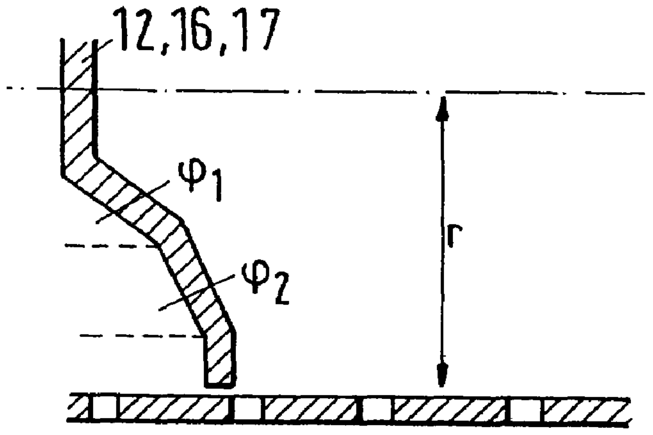
FIG. 5*b* shows a further embodiment of a pre-acceleration funnel.

One embodiment each of a pre-acceleration funnel 12 is shown by way of example and schematically in FIGS. 5*a* and 5*b*. In both figures, one respective pre-acceleration funnel 12 is shown for illustration purposes. As, however, the reference numerals 12, 16 and 17 indicate in FIG. 2*b*, the example shown in FIG. 2*b* for the geometry of a funnel relates both to the inlet funnel 16 and to the pre-acceleration funnel 12.

FIG. 5*a* shows a pre-acceleration funnel 12 with an outer ring region 92 for the displacement of a solid cake 3. The outer ring region 92 has a pre-settable height a which, in dependence on the mixture 2 to be processed and/or on the operation conditions under which the pusher centrifuge 1 in accordance with the invention is operated, amounts to approximately 1% to 40% of the drum radius r, preferably to approximately 5% to 10%, in particular to 5% to 20% of the drum radius r.

As shown schematically in FIG. 5*b*, the funnel 12, 16, 17 can also be made as a multi-stage funnel 12, 16, 17, with the funnel 12, 16, 17 for the pre-acceleration of the mixture 2 being able to have a plurality of part faces which can be inclined at different angles ($\phi_1$, $\phi_2$ to one another, with the relative size of the part face and its inclination angles $\phi_1$, $\phi_2$, for example, being able to depend on the mixture 2 to be processed or on the operating parameters of the pusher centrifuge 1. Both the inlet funnel 16 and the pre-acceleration funnel 12 in accordance with FIG. 5*b* can be made as multi-stage funnels.

Figure 5C:
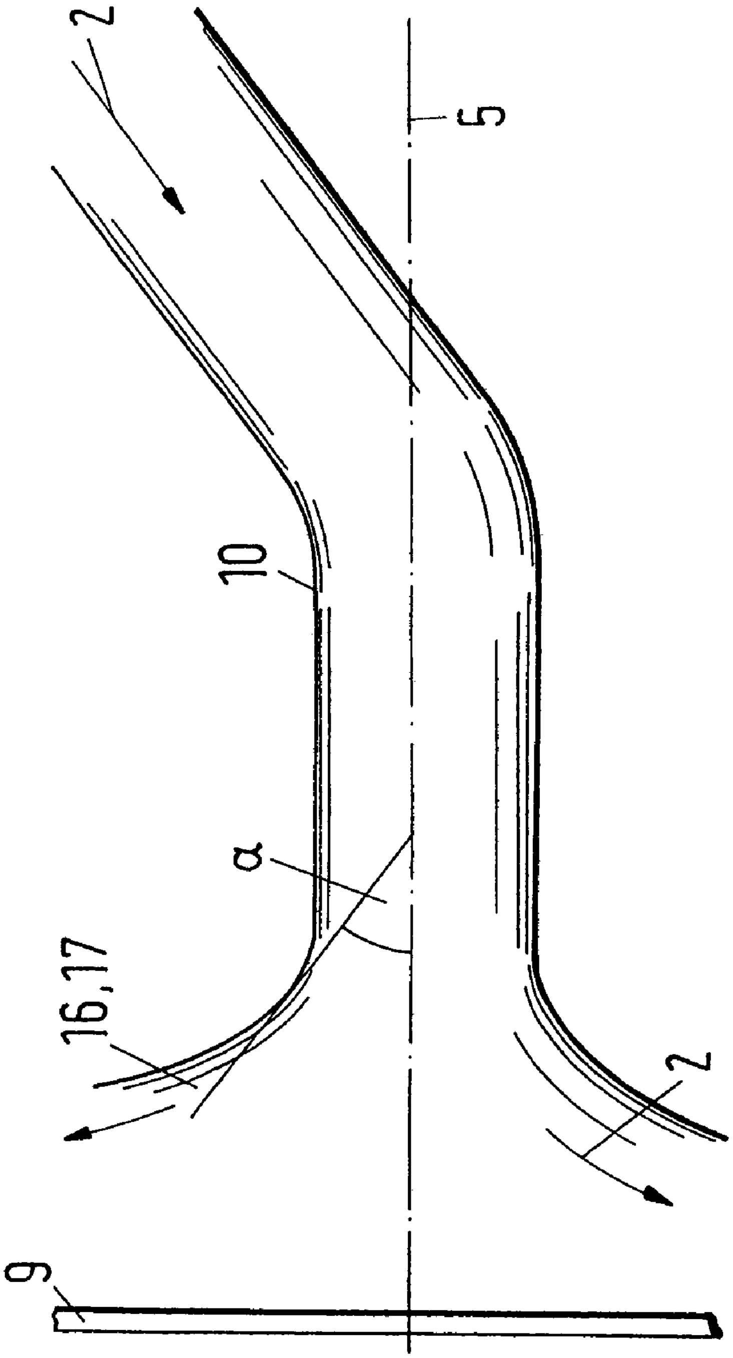
FIG. 5*c* shows an inlet funnel with a curved extent.
Figure 5D:
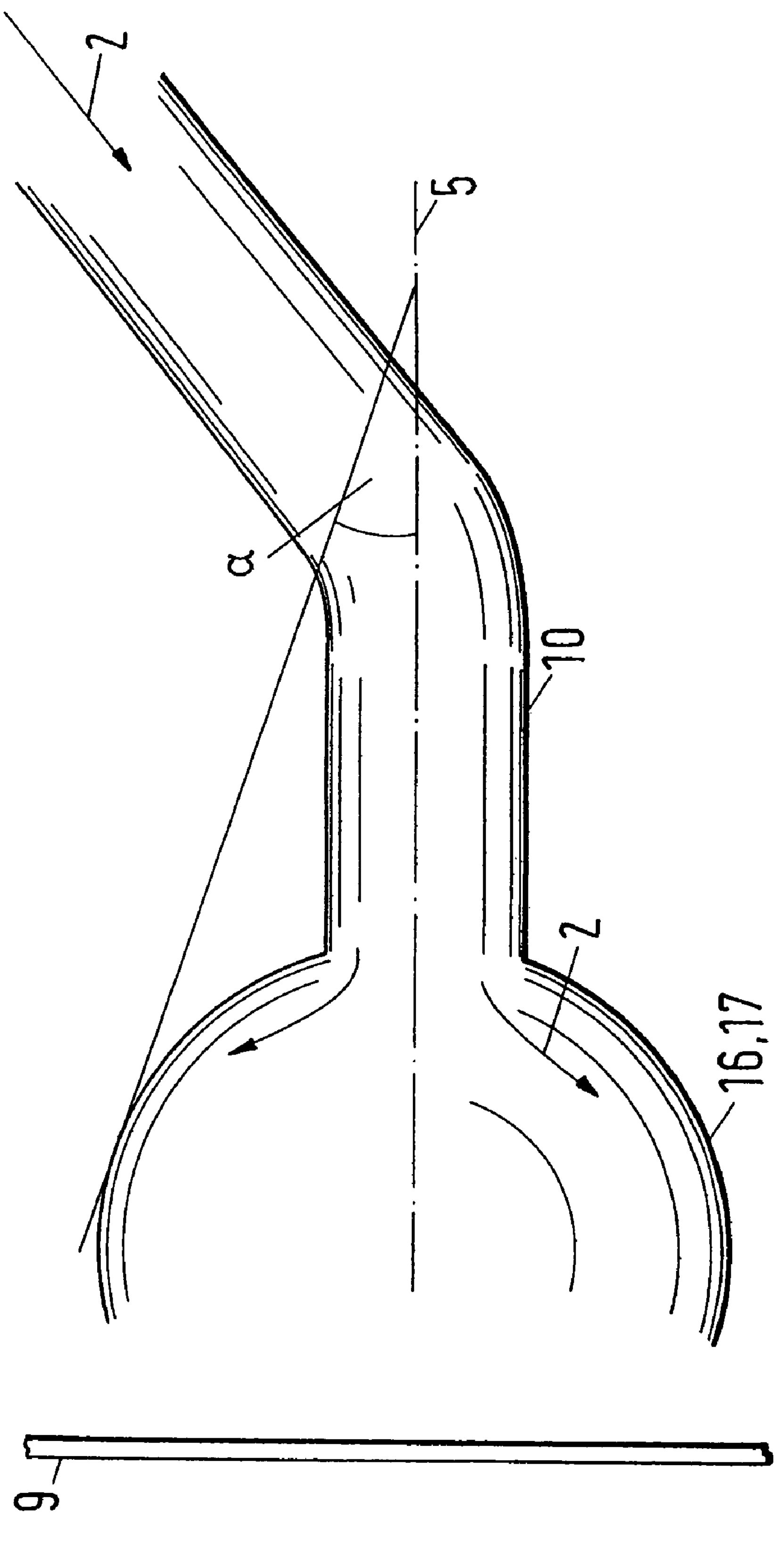
FIG. 5*d* shows another inlet funnel in accordance with FIG. 5*c;*

In particular when, but not only when, the inlet funnel 16 is designed as a pre-filter screen 17 for the pre-separation of liquid phase 4, it can be of particular advantage for the inlet funnel 16 to have a curved extent and for the opening angle $\alpha$ of the inlet funnel 16, as shown schematically in FIGS. 5*c* and 5*d*, to become larger or smaller in the direction towards the pusher base apparatus 9. It is known that different mixtures 2 can have different levels of dewatering under operating conditions of the pusher centrifuge 1 which are otherwise the same, for example in dependence on the grain size and/or on the viscosity and/or on other properties or parameters such as on the temperature of the mixture 2.

If, for example, a mixture 2 is present which is relatively easy to dewater under given operating parameters, it can be of advantage for the inlet funnel 16 or for the pre-filter screen 17 to have a curved extent, with the opening angle $\alpha$ of the pre-filter screen 17 becoming larger in the direction towards the pusher base apparatus 9. Such a specific embodiment of an inlet funnel 16 is shown schematically in FIG. 5*c*. This means that the inlet funnel 16 or the pre-filter screen 17 diverges in the direction towards the pusher base apparatus 9 similar to the horn of a trumpet. The output driving force at which the mixture 2 is accelerated out of the inlet funnel 16 thus becomes disproportionately larger as the spacing to the pusher base apparatus 9 decreases such that the mixture 2 which is already relatively highly dewaterable in the pre-filter screen 17 and thus shows poor slide properties in the pre-filter screen 17 can exit the pre-filter screen 17 faster than, for example, with a pre-filter screen 17 diverging in substantially cone-shape with a constant opening angle $\alpha$.

On the other hand, mixtures 2 can also be present which are relatively difficult to dewater under given operating parameters. In this case, it is recommended to use an inlet funnel 16 or a pre-filter screen 17 with a curved extent, with the opening angle $\alpha$ of the pre-filter screen 17 becoming smaller in the direction towards the pusher base apparatus 9. This has the consequence that the output driving force with which the mixture 2 is accelerated out of the inlet funnel 16 increases more slowly as the spacing towards the pusher base apparatus 9 decreases than, for example, with an inlet funnel 16 diverging conically at a substantially constant opening angle $\alpha$. A certain congestion effect thereby occurs in the pre-filter screen 17 such that the mixture 2 remains longer in the pre-filter screen 17 and is therefore already dewaterable to a higher degree in the pre-filter screen 17.

In a very analogous manner to the aforesaid, the pre-acceleration funnel 12 or the pre-acceleration screen 12 can also have a curved extent, with the pre-acceleration angle $\beta$ of the pre-acceleration funnel 12 becoming larger or smaller in the direction towards the infeed device 10.

Figure 6:
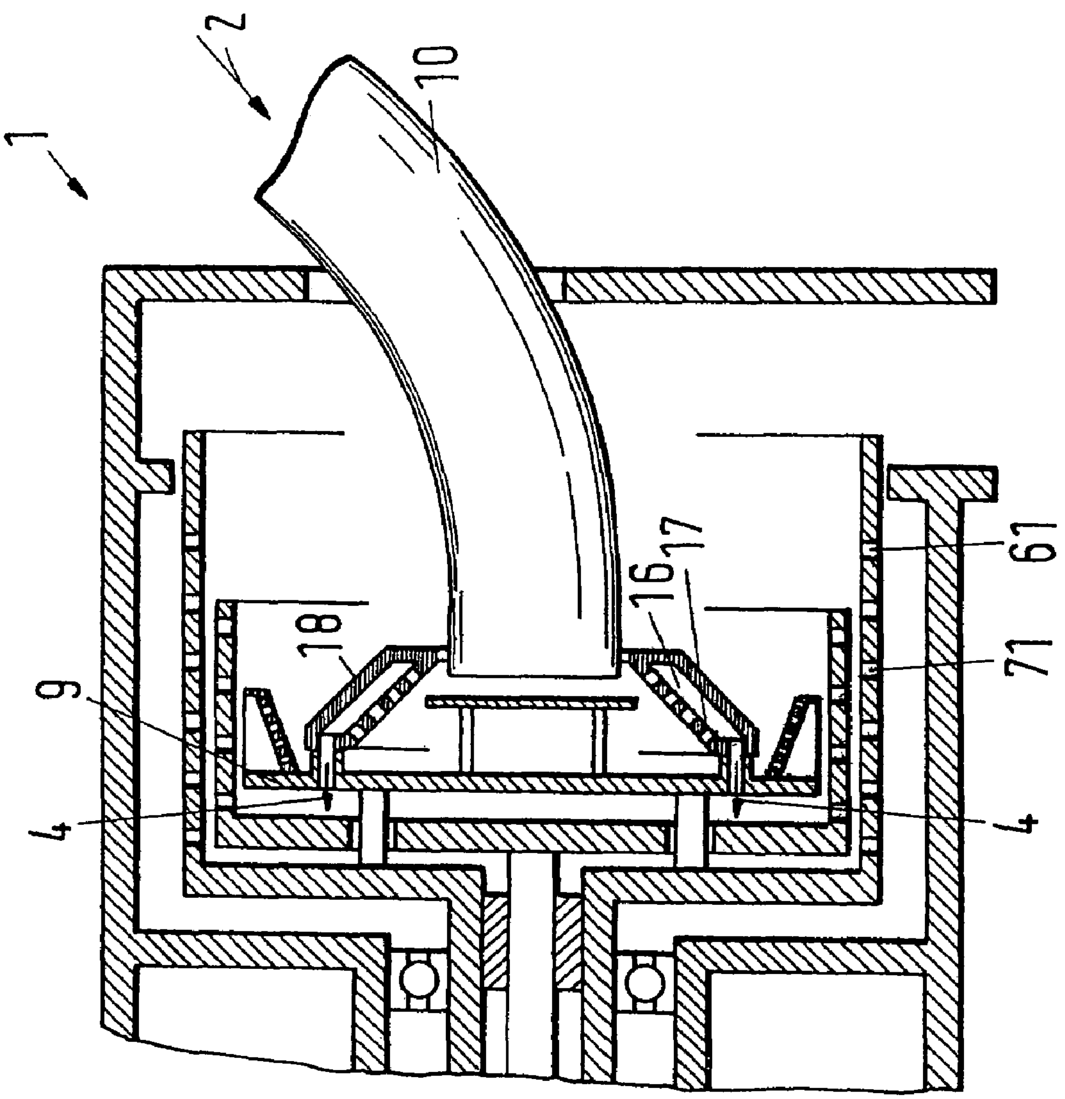
FIG. 6 shows an embodiment in accordance with FIG. 5 with a pre-filter screen.

As shown in FIG. 6, the inlet funnel 16 can preferably be made as a pre-filter screen 17 for the pre-separation of liquid phase 4 from the mixture 2. Collection means 18 are preferably provided for the collection and draining of liquid phase 4 separated from the pre-filter screen 17. The liquid phase 4 can, for example be led through openings in the pusher base apparatus 9 into a region of the screen stage 7 separated from the solid cake 3 and then drained from the screen drum 6 through the screen openings 61, 71, or the liquid phase can, analogously to the embodiment shown in FIG. 3, be drained directly from the screen drum such that this part of the liquid phase is no longer accelerated to the peripheral speed of the screen stage 7 or of the screen drum 6.

Figure 6A:
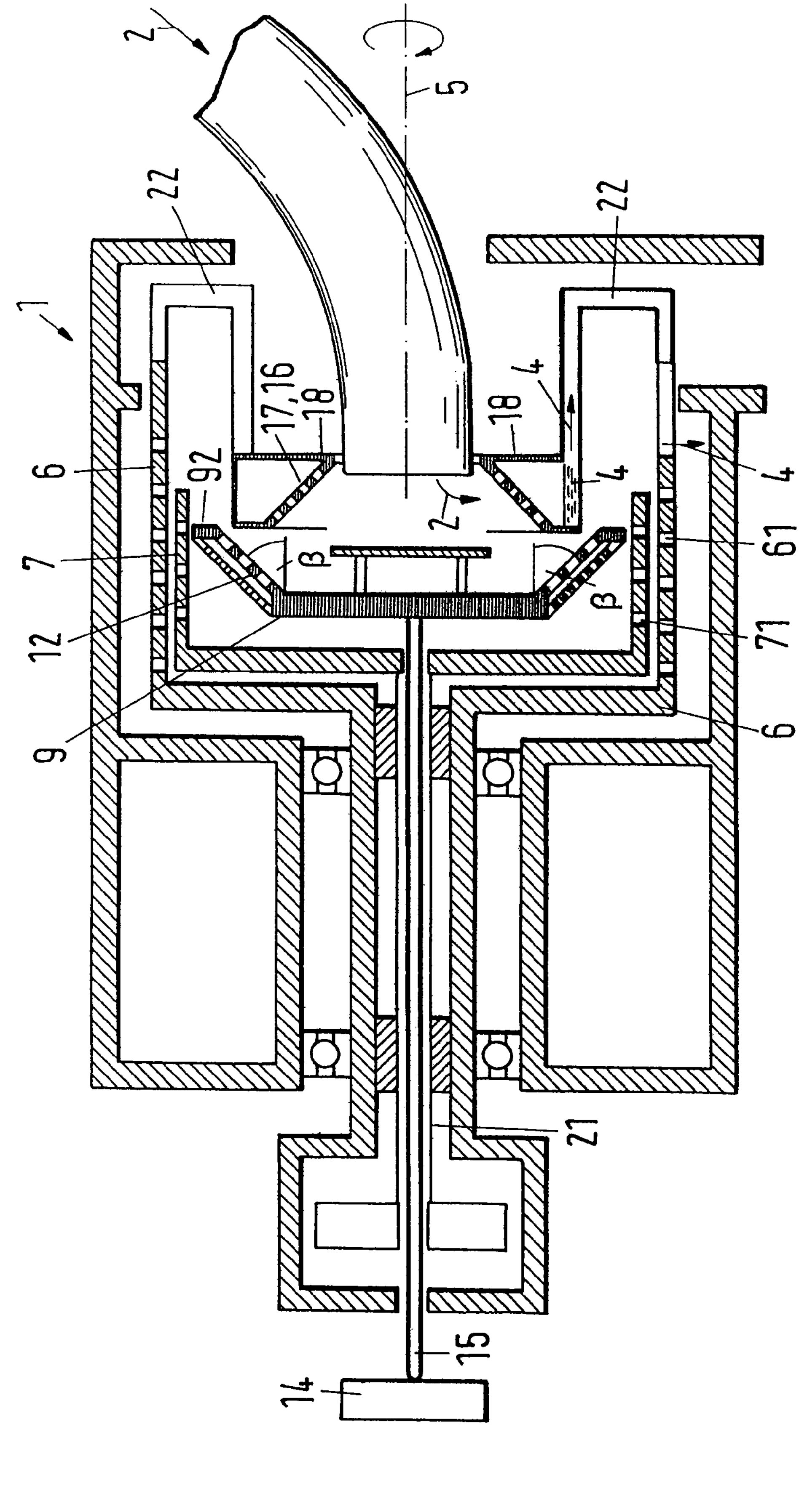
FIG. 6*a* shows a second embodiment in accordance with FIG. 6 with a rotatable pre-acceleration screen.

In the embodiment shown in FIG. 6*a* of a multi-stage pusher centrifuge 1, the inlet funnel 16 is designed as a pre-filter screen 17 and is arranged at the screen drum 6 by means of one or more fastening stubs 22. The fastening stubs 22 are preferably made in the form of suitably shaped spokes 22, thin rods 22 or tubes 22 so that the solid cake 3 can be removed without a problem from the screen stage 7 or from the screen drum 6 in the operating state. At least one of the fastening stubs 22 is made and arranged at an outer rim of the screen drum 6 such that the liquid phase 4 collected in the collection means 18 can be transported through the fastening stub 22 into a screen opening 61 of the screen drum 6 and can be separated from the screen drum 6 through the screen opening 61. Openings can also be provided for the draining of liquid phase 4 at a suitable position at the fastening stub 22 itself.

Depending on the embodiment of the pusher centrifuge 1 in accordance with the invention or depending on the demand, the pre-filter screen 17 can also be arranged by means of one or more fastening stubs 22 to a screen stage 7 or even be arranged at a plurality of screen stages 7 or at a screen stage 7 and at the screen drum 6, with the corresponding drums preferably not carrying out an oscillatory relative movement with respect to one another.

Preferably, but not necessarily, the pre-acceleration funnel 12, that is, the pre-acceleration screen 12, can, for example, rotate at a different rotational speed in one direction of the oscillation movement of the screen stage 7 than with the opposite oscillation movement of the screen stage 7. The rotational frequency of the pre-acceleration funnel 12 can thus, for example, be chosen on the displacement of the solid cake 3 such that the pre-acceleration funnel 12 rotates synchronously with the screen stage 7 so that no relative movement is present with respect to the rotation about the axis of rotation 5 on the displacement between the outer ring region 92 and the solid cake 3 which is deposited on the peripheral surface of the screen stage 7, whereas on the return movement, that is, in the phase of the oscillation movement in which the empty space 11 is loaded with new mixture 2, the pre-acceleration funnel 12 rotates more slowly, for example, than the screen stage 7.

Figure 6B:
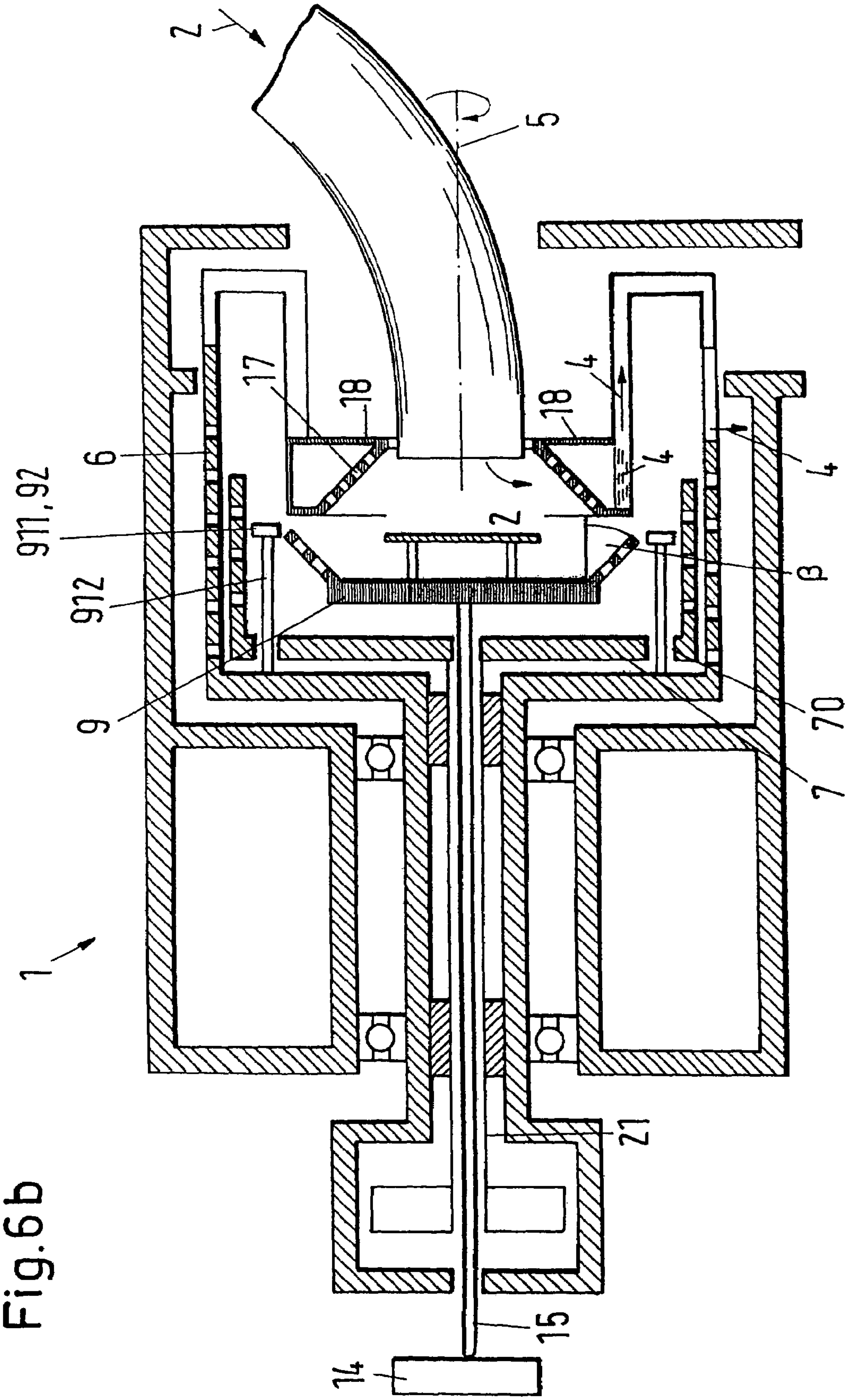
FIG. 6*b* shows a second embodiment in accordance with FIG. 6*a* with a false bottom.

Finally, in FIG. 6*b*, an embodiment in accordance with FIG. 6*a* is shown schematically with a false bottom 911, with the pre-acceleration screen 12 not being shown as a two-stage screen for reasons of clarity. Both the pre-acceleration screen 12 and the pre-filter screen 17 can also be made as a single-stage, two-stage or multi-stage screen.

The embodiment in accordance with FIG. 6*b* has an outer ring region 92 designed as a false bottom 911 which rotates synchronously with the outer screen drum 6, but is uncoupled from the pre-acceleration funnel 12 with respect to the rotational movement such that the pre-acceleration funnel 12, that is, the pre-acceleration screen 12, is rotatable about the axis of rotation 5 at a different speed of rotation to the false bottom 911. For this purpose, as shown schematically in FIG. 6*b*, the false bottom 911 is rotationally fixedly connected to the outer screen drum 6 via at least one fastening strut 912, with the fastening strut 912 being guided through a suitably placed opening 70 in the screen stage 7 such that the fastening strut 912 is uncoupled from the oscillation movement of the screen stage 7. The embodiment in accordance with FIG. 6*b* can also be transferred analogously to pusher centrifuges 1 with more stages than two-stage pusher centrifuges 1.

The advantages of the variant in accordance with FIG. 6*b* are obvious. On the one hand, the pre-acceleration funnel 12 can be driven completely independently of the speed of rotation of the outer screen drum 6 at a rotational frequency which can be matched to the mixture 2 to be processed and, on the other hand, the false bottom 911 which transports the solid cake 3 in the axial direction rotates at the same speed of rotation as the screen drum 6 or as the screen stage 7 such that no relative movement takes place with respect to the rotation about the axis of rotation 5 between the false bottom 911 and the screen stage 7. The rotational speed can also be variable in this case, for example in dependence on an instantaneous operating state of the pusher centrifuge 1, as already described above.

Figure 7:
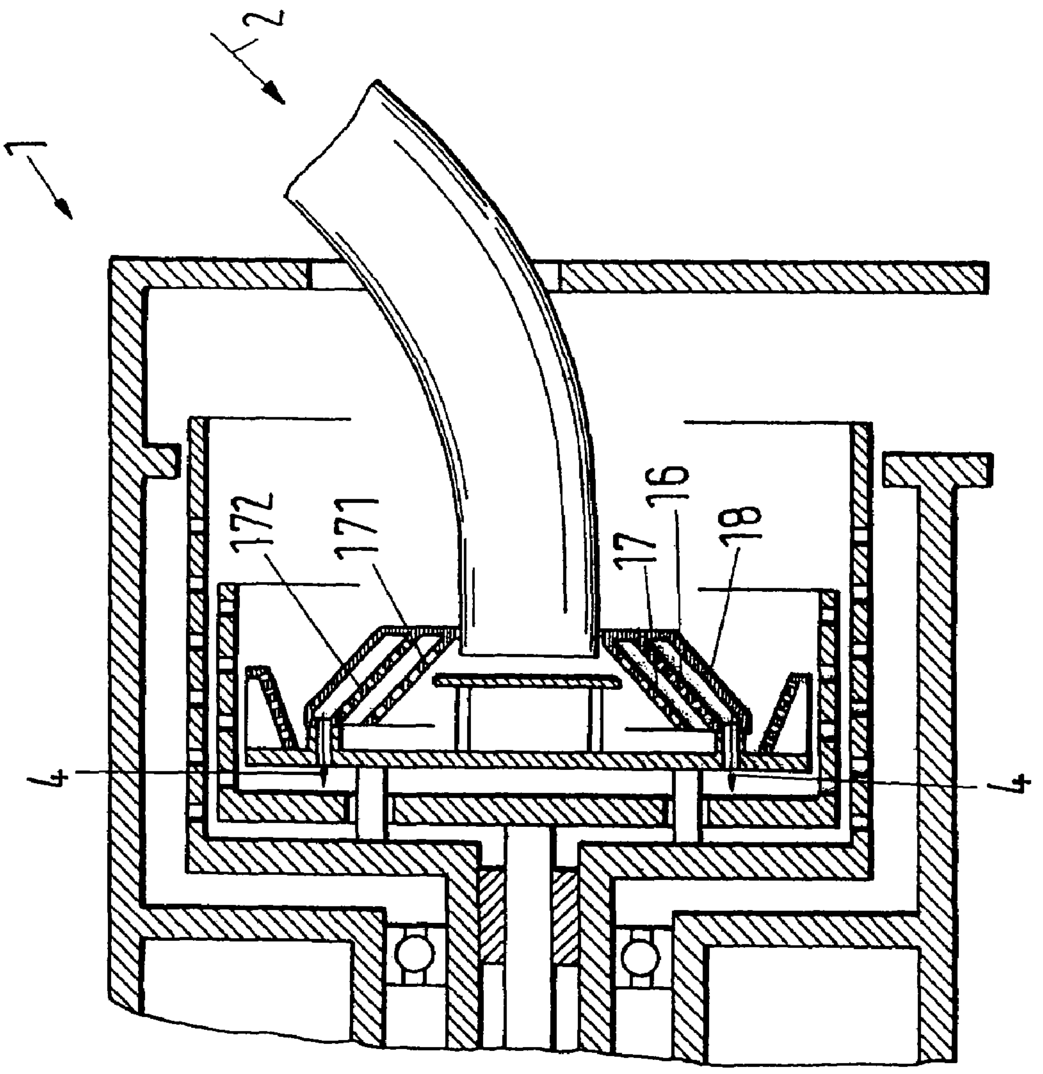
FIG. 7 shows a second embodiment in accordance with FIG. 6 with a coarse screen and a fine screen.

As shown by way of example in FIG. 7, the pre-filter screen 17 can also be designed as a two-stage screen with a coarse screen 171 and a fine screen 172. The first filter stage is formed by the coarse screen 171 which holds back particles contained in the mixture 2 which are larger than the filter openings of the coarse screen 171. The fine screen 172 holds back correspondingly finer particles, whereas at least some of the liquid phase 4 as well as very fine particles which likewise have to be removed can be drained directly from the screen stage 7. The design of the pre-filter screen 17 as a two-stage screen in particular has the advantage that the fine screen 172 is not put under such strong mechanical strain by large and/or heavy particles which can be contained in the incoming mixture 2 so that the fine screen 172 can, for example, have very small pores for the filtering of very small particles and can in particular also be made from mechanically less resistant materials.

Figure 8:
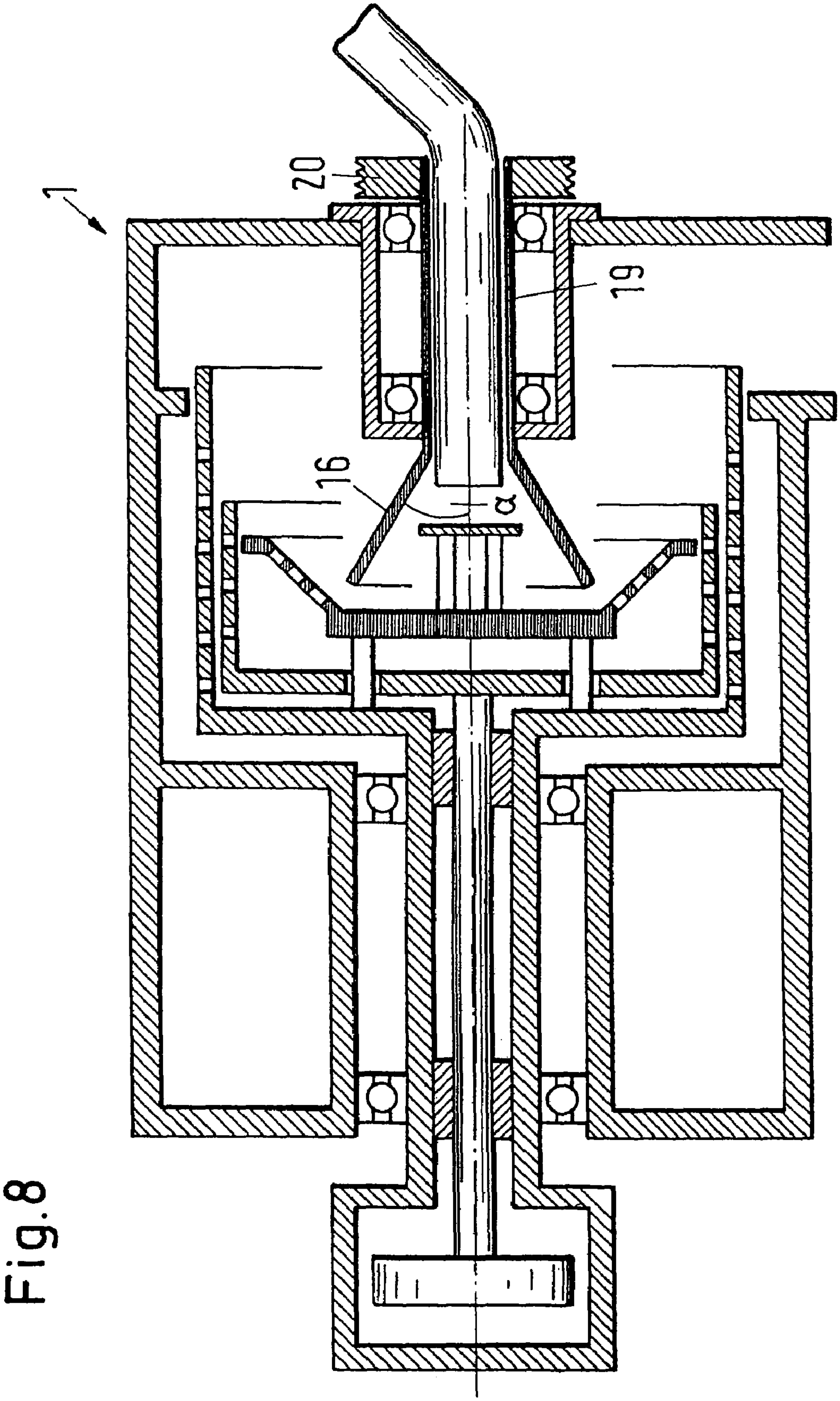
FIG. 8 shows an inlet funnel with a rotational drive.

It can be of great importance in practice to directly control the acceleration process itself or the rotational speed to which the mixture 2 can be accelerated in the inlet funnel 16. This can, for example, be achieved with the further variant of a pusher centrifuge 1 in accordance with the invention shown in FIG. 8. In the variant in accordance with FIG. 8, the inlet funnel 16 is mechanically uncoupled from the mixture distributor 8. For the control and/or regulation of the rotational speed of the inlet funnel 16, it is rotationally fixedly connected to a separate drive axle 19 and drivable at a pre-settable rotationally frequency via the drive axle 19 by means of a drive 20 independently of the screen drum 6. Suitable means, not shown here, can be provided to control and/or regulate the drive 20, for example in dependence on suitable operating parameters of the multi-stage pusher centrifuge 1.

It is self-explanatory that the previously explained variants shown schematically in the figures can also be combined as desired with one another to form further embodiments to satisfy specific demands in practice.

By the use of the multi-stage pusher centrifuge in accordance with the invention, the mixture introduced through the pre-acceleration screen arranged at the pusher base apparatus can be pre-accelerated to a pre-settable peripheral speed such that the mixture is not accelerated to the full peripheral speed of the inner screen stage from a peripheral speed close to zero in a very short time on impacting the screen drum. Grain breakage can, among other things, thereby be avoided such that in particular also substances which are particularly sensitive to abrupt changes of a centrifugal acceleration or a radial acceleration are processed while observing very high quality demands.

In the different preferred embodiments, in particular also much lower inlet concentrations can moreover be processed which correspond, for example, to a 50% or 70% or 80% or even more than a 90% proportion of liquid phase, since a substantial part of the liquid phase contained in the mixture can already be separated in the pre-acceleration screen. It is in particular possible by the additional use of the pre-filter screen to process mixtures with almost any desired large liquid content without the liquid having to be pre-condensed in complex methods. It is thus also always ensured with an extremely high liquid content that a uniform distribution of the mixture to be dried takes place over the inner peripheral surface of the inner screen stage or of the screen drum. Very damaging vibrations of the screen drum and thus the premature wear of bearings and drive are thus prevented and safety problems in operation are effectively prevented. Furthermore, problems in the washing of the solid cake due to its uneven distribution over the peripheral surface of the screen drum are very largely avoided. The use of pre-dewatering systems which are very complex both in a technical process aspect and in an apparatus aspect is likewise avoided, which results in substantial cost savings in operation.

When the previously mentioned filter systems are used, the whole volume of liquid phase which is supplied with mixture also no longer has to be accelerated to the full peripheral speed of the screen drum. This is in particular extremely favorable with respect to the energy consumption of the multi-stage pusher centrifuge in accordance with the invention and moreover influences the operating behavior of the centrifuge overall in a very positive manner.

By corresponding different designs of the different filter surfaces and in particular by the use of the pre-acceleration funnel and/or of the inlet funnel with a separate drive, it is possible even to process very sensitive mixtures even at high speeds of rotation of the screen drum while maintaining very high quality standards.

The invention claimed is:

1. A multi-stage pusher centrifuge for the separation of a mixture into a solid cake and into a liquid phase, including an outer screen drum rotatable about an axis of rotation and at least one screen stage arranged in the outer screen drum, a mixture distributor arranged in the screen drum with a pusher base apparatus, with either the screen stage or the pusher base apparatus being arranged movably to and fro along the axis of rotation such that the solid cake is displaceable by means of the pusher base apparatus, and including an infeed device with which the mixture can be introduced via the mixture distributor into an empty space which arises on the displacement of the solid cake by the pusher base apparatus, with the pusher base apparatus including a pre-acceleration funnel which extends in a substantially divergent manner in the direction towards the infeed device, wherein the pre-acceleration funnel is designed as a pre-acceleration screen, and wherein the pre-acceleration funnel has a curved extent and a pre-acceleration angle which becomes one of larger and smaller in the direction towards the infeed device.

2. A multi-stage pusher centrifuge in accordance with claim 1, wherein the pre-acceleration funnel extends at a substantially constant pre-acceleration angle in a conically divergent manner in the direction towards the infeed device.

3. A multi-stage pusher centrifuge in accordance with claim 1, wherein the pre-acceleration screen is designed as a two-stage filter with a coarse filter and a fine filter.

4. A multi-stage pusher centrifuge in accordance with claim 1, wherein a collection device is provided at the mixture distributor for the draining of liquid phase.

5. A multi-stage pusher centrifuge in accordance with claim 1, wherein a value of the pre-acceleration angle of the pre-acceleration screen with respect to the axis of rotation lies between 0° and 45°.

6. A multi-stage pusher centrifuge according to claim 5 wherein the value of the pre-acceleration angle lies between 0° and 10°.

7. A multi-stage pusher centrifuge according to claim 5 wherein the value of the pre-acceleration angle lies between 10° and 45°.

8. A multi-stage pusher centrifuge in accordance with claim 7, wherein the pre-acceleration funnel has a curved extent and the pre-acceleration angle of the pre-acceleration funnel becomes larger in the direction towards the infeed device.

9. A multi-stage pusher centrifuge in accordance with claim 7, wherein the pre-acceleration funnel has a curved extent and the pre-acceleration angle of the pre-acceleration funnel becomes smaller in the direction towards the infeed device.

10. A multi-stage pusher centrifuge according to claim 5 wherein the value of the pre-acceleration angle lies between 25° and 45°.

11. A multi-stage pusher centrifuge in accordance with claim 1, wherein the pre-acceleration funnel is designed and arranged such that the pre-acceleration screen is rotatable at a pre-settable speed of rotation about an axis of rotation by means of a rotational drive.

12. A multi-stage pusher centrifuge in accordance with claim 1, wherein, at the infeed device, an inlet funnel is arranged which extends at a substantially constant opening angle in a conically divergent manner in the direction towards the pusher base apparatus.

13. A multi-stage pusher centrifuge in accordance with claim 1, including an inlet funnel at the infeed device which has a curved extent and an opening angle which becomes larger in the direction towards the pusher base apparatus.

14. A multi-stage pusher centrifuge in accordance with claim 1, including an inlet funnel at the infeed device which has a curved extent and an opening angle which becomes smaller in the direction towards the pusher base apparatus.

15. A multi-stage pusher centrifuge in accordance with claim 1, including an inlet funnel that is rotatably arranged about a drive axis and that can be rotated at a pre-settable speed of rotation about the drive axis by means of a drive.

16. A multi-stage pusher centrifuge in accordance with claim 1, including an inlet funnel at the infeed device configured as a pre-filter screen for the pre-separation of liquid phase from the mixture.

17. A multi-stage pusher centrifuge in accordance with claim 16, wherein the pre-filter screen is designed as a two-stage screen with a coarse screen and a fine screen.

18. A multi-stage pusher centrifuge in accordance with claim 16, wherein collection means are provided for the collection and draining of the liquid phase from the pre-filter screen.

19. A multi-stage pusher centrifuge for the separation of a mixture into a solid cake and into a liquid phase, including an outer screen drum rotatable about an axis of rotation and at least one screen stage arranged in the outer screen drum, a mixture distributor arranged in the screen drum with a pusher base apparatus, with either the screen stage or the pusher base apparatus being arranged movably to and fro along the axis of rotation such that the solid cake is displaceable by means of the pusher base apparatus, and including an infeed device with which the mixture can be introduced via the mixture distributor into an empty space which arises on the displacement of the solid cake by the pusher base apparatus, the pusher base apparatus including a pre-acceleration funnel which extends in a substantially divergent manner in the direction towards the infeed device, wherein the pre-acceleration funnel is designed as a pre-acceleration screen, and wherein, at the infeed device, an inlet funnel is arranged which extends at a substantially constant opening angle in a conically divergent manner in the direction towards the pusher base apparatus.

20. A multi-stage pusher centrifuge for the separation of a mixture into a solid cake and into a liquid phase, including an outer screen drum rotatable about an axis of rotation and at least one screen stage arranged in the outer screen drum, a mixture distributor arranged in the screen drum with a pusher base apparatus, with either the screen stage or the pusher base apparatus being arranged movably to and fro along the axis of rotation such that the solid cake is displaceable by means of the pusher base apparatus, and including an infeed device with which the mixture can be introduced via the mixture distributor into an empty space which arises on the displacement of the solid cake by the pusher base apparatus, the pusher base apparatus including a pre-acceleration funnel which extends in a substantially divergent manner in the direction towards the infeed device, wherein the pre-acceleration funnel is designed as a pre-acceleration screen, and including an inlet funnel which has a curved extent and an opening angle which becomes one of larger and smaller in the direction towards the pusher base apparatus.

* * * * *